(12) United States Patent
Pujar et al.

(10) Patent No.: US 12,508,747 B2
(45) Date of Patent: Dec. 30, 2025

(54) SYSTEMS AND METHODS FOR BLADDER PRESSURE FORMING A PREFORM INTO A SHAPED BODY

(71) Applicant: Rohr Inc., Chula Vista, CA (US)

(72) Inventors: Vijay V. Pujar, San Diego, CA (US); Katherine E. Waugh, San Diego, CA (US); Christopher C. Koroly, Spring Valley, CA (US)

(73) Assignee: ROHR, INC., Chula Vista, CA (US)

( * ) Notice: Subject to any disclaimer, the term of this patent is extended or adjusted under 35 U.S.C. 154(b) by 390 days.

(21) Appl. No.: 17/978,053

(22) Filed: Oct. 31, 2022

(65) Prior Publication Data
US 2024/0139795 A1 May 2, 2024

(51) Int. Cl.
*B29C 43/10* (2006.01)
*B21D 26/033* (2011.01)
*B29C 43/36* (2006.01)

(52) U.S. Cl.
CPC .......... *B29C 43/10* (2013.01); *B29C 43/3642* (2013.01); *B21D 26/033* (2013.01); *B29C 2043/3602* (2013.01); *B29C 2043/3649* (2013.01)

(58) Field of Classification Search
CPC ............... B29C 43/10; B29C 43/3642; B29C 2043/3602; B29C 2043/3649; B29C 70/446; B29C 70/541; B29C 70/549; B29C 70/56; B21D 26/033
See application file for complete search history.

(56) References Cited

U.S. PATENT DOCUMENTS

| | | | |
|---|---|---|---|
| 2,363,107 | A | 11/1944 | Serenus |
| 3,266,767 | A | 8/1966 | Long |
| 3,279,740 | A | 10/1966 | Long |
| 3,901,640 | A | 8/1975 | Tigner et al. |
| 4,338,070 | A | 7/1982 | Nava et al. |
| 4,443,401 | A | 4/1984 | Turner et al. |
| 5,207,963 | A | 5/1993 | Grace |
| 5,290,167 | A | 3/1994 | Tanaka et al. |
| 5,321,109 | A | 6/1994 | Bosse et al. |
| 5,552,006 | A | 9/1996 | Soliday et al. |

(Continued)

FOREIGN PATENT DOCUMENTS

| | | |
|---|---|---|
| DE | 742682 | 12/1943 |
| DE | 4234002 | 4/1994 |

(Continued)

OTHER PUBLICATIONS

European Patent Office, European Search Report dated Mar. 22, 2024 in Application No. 23203824.0.

(Continued)

*Primary Examiner* — S. Behrooz Ghorishi
(74) *Attorney, Agent, or Firm* — SNELL & WILMER L.L.P.

(57) ABSTRACT

A manufacturing method is provided. A preform is arranged over a surface of an inner mold line. The preform is folded over sides of the inner mold line. An end of the preform is clamped to a floating plate using a bladder-activated clamp. The floating plate is translated in a first direction to tension the preform into a shaped body. A plurality of compressing bladders are activated to apply compressive forces to the preform.

11 Claims, 15 Drawing Sheets

(56) References Cited

U.S. PATENT DOCUMENTS

| | | | |
|---|---|---|---|
| 6,149,844 | A | 11/2000 | Graham |
| 7,429,172 | B2 | 9/2008 | Chotard |
| 7,622,066 | B2 | 11/2009 | Brustad et al. |
| 8,632,330 | B2 | 1/2014 | Jones et al. |
| 9,958,365 | B2 | 5/2018 | Heinlein et al. |
| 10,654,229 | B2 | 5/2020 | Coxon et al. |
| 10,759,122 | B2 | 9/2020 | Mathon et al. |
| 10,889,073 | B2 | 1/2021 | Destories et al. |
| 2004/0043196 | A1 | 3/2004 | Willden et al. |
| 2005/0127566 | A1 | 6/2005 | Chotard |
| 2009/0025448 | A1 | 1/2009 | Krogager et al. |
| 2009/0039566 | A1 | 2/2009 | Rodman et al. |
| 2011/0272536 | A1 | 11/2011 | Valemnbois |
| 2012/0196083 | A1 | 8/2012 | Hanawa et al. |
| 2013/0341816 | A1 | 12/2013 | Bergmann |
| 2015/0328843 | A1 | 11/2015 | Karb et al. |
| 2016/0016359 | A1 | 1/2016 | Kondo et al. |
| 2017/0182686 | A1 | 6/2017 | Mankowski et al. |
| 2018/0169972 | A1 | 6/2018 | Mathon et al. |
| 2018/0257314 | A1 | 9/2018 | Destories et al. |
| 2020/0346419 | A1 | 11/2020 | Rigamonti et al. |
| 2020/0384708 | A1 | 12/2020 | Salimi et al. |
| 2021/0221073 | A1 | 7/2021 | Knebel et al. |
| 2022/0080649 | A1 | 3/2022 | Plummer et al. |
| 2024/0060460 | A1 * | 2/2024 | Minervino .............. B29C 70/72 |

FOREIGN PATENT DOCUMENTS

| | | | |
|---|---|---|---|
| DE | 102014015414 | | 4/2016 |
| EP | 1778460 | | 1/2018 |
| EP | 4104995 | | 12/2022 |
| EP | 4261000 | | 10/2023 |
| JP | S60206619 | | 10/1985 |
| JP | 2001038752 A | * 2/2001 | ............. B29C 43/12 |
| WO | 0050211 | | 8/2000 |

OTHER PUBLICATIONS

European Patent Office, European Search Report dated Mar. 27, 2024 in Application No. 23204208.5.

European Patent Office, European Search Report dated Apr. 15, 2024 in Application No. 23206842.9.

USPTO; Advisory Action dated Feb. 14, 2024 in U.S. Appl. No. 17/977,913.

USPTO; Non-Final Office Action dated Aug. 30, 2023 in U.S. Appl. No. 17/977,913.

USPTO; Non-Final Office Action dated Jun. 4, 2024 in U.S. Appl. No. 17/977,913.

USPTO; Final Office Action dated Dec. 19, 2023 in U.S. Appl. No. 17/977,913.

USPTO; Advisory Action dated Dec. 18, 2024 in U.S. Appl. No. 17/977,913.

USPTO; Non-Final Office Action dated Feb. 10, 2025 in U.S. Appl. No. 17/977,913.

USPTO; Notice of Allowance dated Feb. 12, 2025 in U.S. Appl. No. 17/977,781.

USPTO; Final Office Action dated Oct. 7, 2024 in U.S. Appl. No. 17/977,913.

USPTO; Non-Final Office Action dated Oct. 1, 2024 in U.S. Appl. No. 17/977,781.

USPTO; Requirement for Restriction/ Election dated Jul. 31, 2024 in U.S. Appl. No. 17/977,781.

USPTO; Notice of Allowance dated Mar. 12, 2025 in U.S. Appl. No. 17/977,781.

* cited by examiner

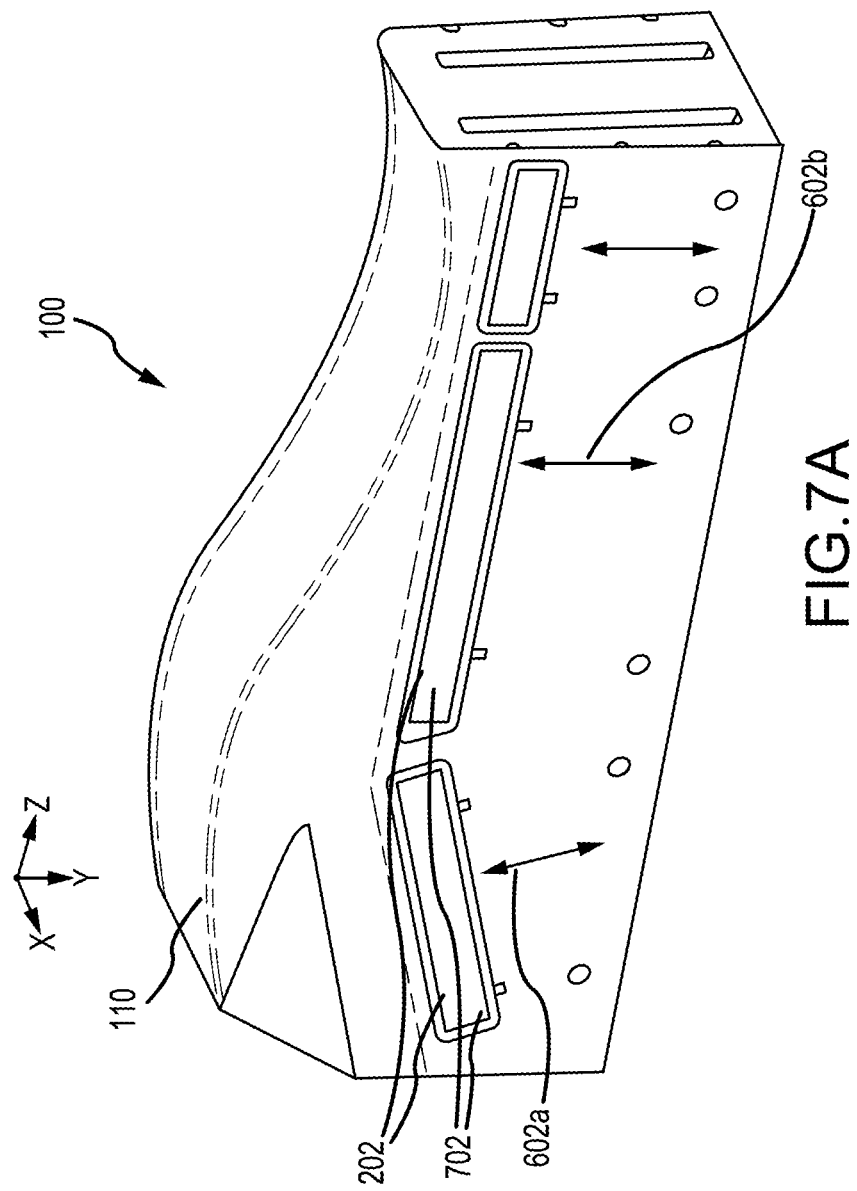

SYSTEMS AND METHODS FOR BLADDER PRESSURE FORMING A PREFORM INTO A SHAPED BODY

FIELD

The present disclosure relates generally to forming a preform into a shaped body.

BACKGROUND

Shaped composite bodies are utilized in aerospace applications. Various systems and methods are known in the art for forming a preform into a shaped body.

SUMMARY

According to various embodiments of the present disclosure, a manufacturing method is provided. The manufacturing method includes arranging a preform over a surface of an inner mold line, folding the preform over sides of the inner mold line, positioning an end of the preform over a floating plate coupled to a side of the inner mold line, clamping the end of the preform to the floating plate, wherein the clamping is provided by activating a clamping bladder to apply a first clamping force to the preform to secure the end of the preform with respect to the floating plate, translating the floating plate in a first direction to apply a first tension on the preform into a shaped body, and activating a first compressing bladder to apply a first compressive force to the preform.

In various embodiments, the floating plate is coupled to a tensioning system through the side of the inner mold line.

In various embodiments, the tensioning system is at least one of a gear rack-based tensioning system or a screw-based tensioning system.

In various embodiments, the floating plate is coupled to the tensioning system through one or more pockets in the side of the inner mold line.

In various embodiments, the first compressing bladder is activated by inflating the first compressing bladder with a fluid.

In various embodiments, the first compressing bladder is mounted to a caul plate moveable with respect to the inner mold line. The caul plate may have a different rigidity than the bladder (i.e., the caul plate may be more rigid than the bladder)

In various embodiments, the manufacturing method further comprises activating a second compressing bladder to apply a second compressive force to the preform, wherein the second compressing bladder is activated after the first compressing bladder.

In various embodiments, the manufacturing method further comprises increasing the first compressive force coupled with increasing the first tension.

In various embodiments, the manufacturing method further comprises activating a second compressing bladder to apply a second compressive force to the preform, and activating a third compressing bladder to apply a third compressive force to the preform. The first compressing bladder, the second compressing bladder, and the third compressing bladder may be activated sequentially along a second direction (e.g., from one end of the preform to another). The first compressing bladder, the second compressing bladder, and the third compressing bladder may be activated starting from a center of the preform and working outward toward a periphery of the preform (e.g., from a central location of the preform outward).

Also disclosed herein is a system for forming a preform into a shaped body. The system includes an inner mold line, a caul plate, a plurality of compressing bladders mounted to the caul plate, and a floating plate coupled to a side of the inner mold line. The floating plate is configured to receive an end of the preform and translate in a first direction to tension the preform into the shaped body.

In various embodiments, the system further comprises a grip strip coupled to the floating plate and wherein the grip strip is configured to receive the end of the preform.

In various embodiments, the system further comprises a tensioning system, wherein the floating plate is coupled to the tensioning system through a side of the inner mold line.

In various embodiments, the tensioning system is at least one of a gear rack-based tensioning system or a screw-based tensioning system.

In various embodiments, the system further comprises a fluid source fluidly coupled, via a first valve, to at least one compressing bladder of the plurality of compressing bladders.

In various embodiments, the system further comprises a clamp comprising a clamping bladder, wherein the clamping bladder is configured to apply a clamping force to the preform to secure the end of the preform with respect to the floating plate.

Also disclosed herein is a bladder-activated clamp. The bladder-activated clamp includes a clamp body defining a pocket, and a bladder disposed in the pocket of the clamp body. The bladder is configured to expand to apply a clamping force to clamp an item between the bladder and a clamping surface.

In various embodiments, the bladder-activated clamp further comprises a fluid source, and a valve whereby the fluid source is in fluid communication with the bladder.

In various embodiments, the bladder-activated clamp further comprises an aperture disposed in the clamp body, and a fastener configured to extend through the aperture for securing the clamp body with respect to the clamping surface.

In various embodiments, an opening of the pocket is configured to face the clamping surface.

In various embodiments, the bladder comprises an elastomeric material.

The present disclosure may include any one or more of the individual features disclosed above and/or below alone or in any combination thereof.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

FIGS. 7A and 7B illustrates a grip strip application process, in accordance with various embodiments.

DETAILED DESCRIPTION

Figure 1:
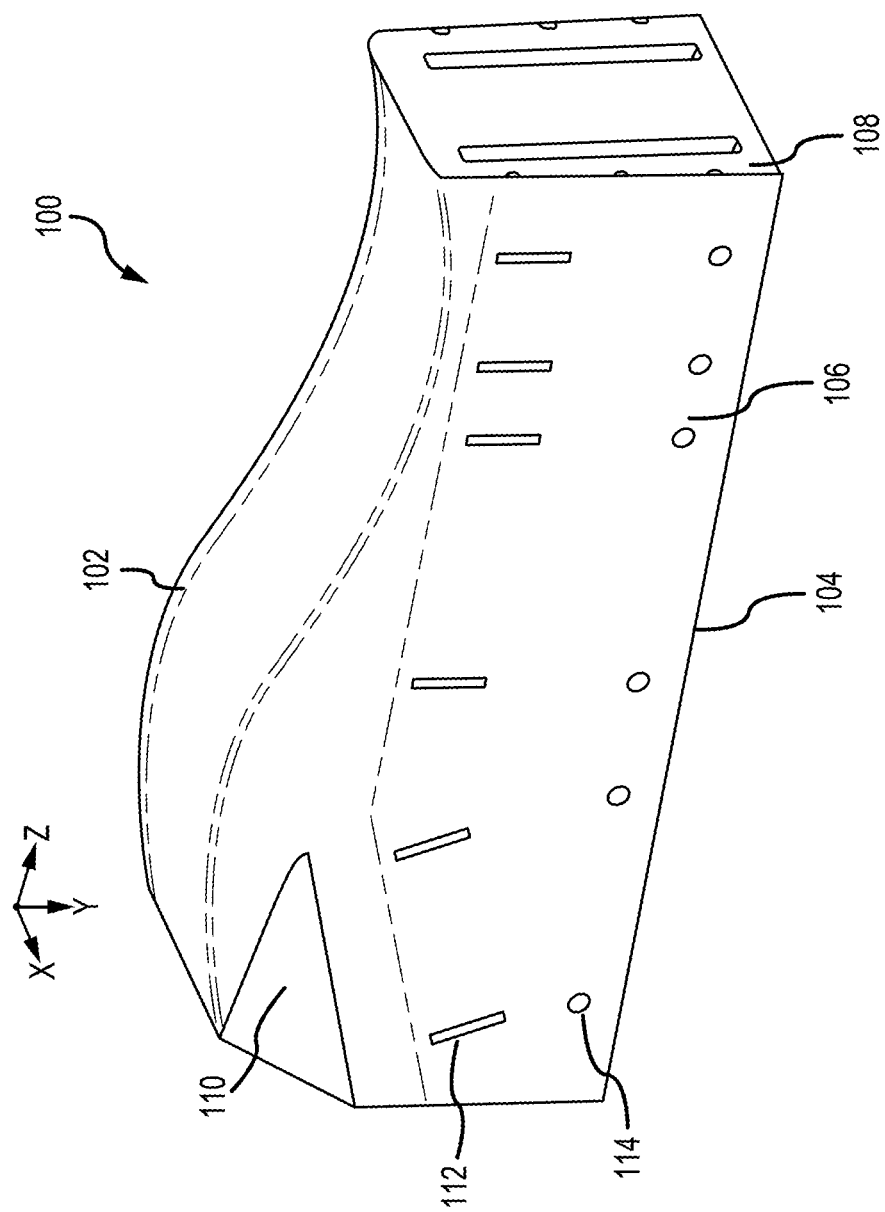
FIG. 1 illustrates an inner-mold line for use in forming a shaped body from a preform, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

Disclosed herein are systems and methods for forming a preform into a shaped body. The systems and methods relate to complex geometry carbon preforms for C—C composites with curvatures along multiple planes. To properly form a shaped body, appropriate tension must be applied to the preform, such that the preform may be stretched around various corners and radii with little to no wrinkling or fiber kinking—important to achieve target mechanical properties and reproducibility. In various embodiments, the systems and methods disclosed herein, in various embodiments, apply even tension to the side wall edges of the preform. In various embodiments, the preform is coupled to floating grip plates, which are coupled to a male inner mold line (IML) tool. In various embodiments, the floating grip plates impart controlled translation along the IML, surface to regulate the tension or stretch on the side walls edges of a preform. In various embodiments, the floating grip plates include an adjustable tensioning system that sits underneath a surface of the IML. In various embodiments, the adjustable tensioning system is controlled by a knob/crank located outside of the tool. In various embodiments, grip strips may be bonded on top of the floating grip plates via adhesive tape or may be mechanically fastened to the grip plate. In various embodiments, the preform is pressed onto the grip strip and may be held onto the grip strips with bladder-activated clamps or hooks, among others. In various embodiments, the preforms may then be compressed by controllable bladder pressure (i.e., positive pressure). In various embodiments, the positive pressure on the preforms may be applied using one or more caul plates and a plurality of pressurized bladders to apply uniform (or varied as desired) pressure and compaction.

The disclosed systems and methods for forming a preform into a shaped body is an improvement over the current matched-die tooling for shape-forming, in various embodiments, by reducing or eliminating undesired wrinkling and kinking during part forming. The disclosed improvements to tooling and forming, in various embodiments, addresses the wrinkling and uneven compression issues seen in the match-die tooling approach. The utilization of controllable bladders—together with floating grip plates—provides an efficient, yet elegant, way to ensure even compression and/or tension throughout the part, while utilizing best practices from current stretch/shape-forming procedures. In addition, the utilization of a plurality of controllable bladders—together with floating grip plates—provides an elegant mechanism for varying and precisely controlling the compression and/or tension of the preform in different regions thereby allowing the preform to be formed into the desired shape while reducing or eliminating undesired wrinkling or kinking.

Referring now to FIG. 1, in accordance with various embodiments, an inner-mold line for use in forming a shaped body from a preform is illustrated. Inner-mold line (IML) 100 includes a top section 102, a bottom section 104, side sections 106, and a plurality of IML, stiffeners 108. In various embodiments, the outer portion of the top section 102, the bottom section 104, and the side sections 106 form an IML surface 110 for a given preform with given dimensions. In various embodiments, the side sections 106 may be substantially vertical. In various embodiments, the side sections 106 may be substantially parallel to the y-axis. In various embodiments, the side sections 106 may be substantially perpendicular to the x-axis. In various embodiments, the side sections 106 include a plurality of slots or pockets 112 for one or more floating plates. In various embodiments, each of the plurality of pockets 112 are rectangular shaped slots that provide a clearance for a threaded connection, i.e., a screw and threaded standoff, between a floating plate on an outer portion of the IML 100 and an associated gear rack on an inner portion of the IML 100. In various embodiments, the side sections 106 further include a plurality of thru-holes 114 that provide access to a tensioning system from the outer portion of the IML 100 outside a compression mechanism area.

Figure 2:
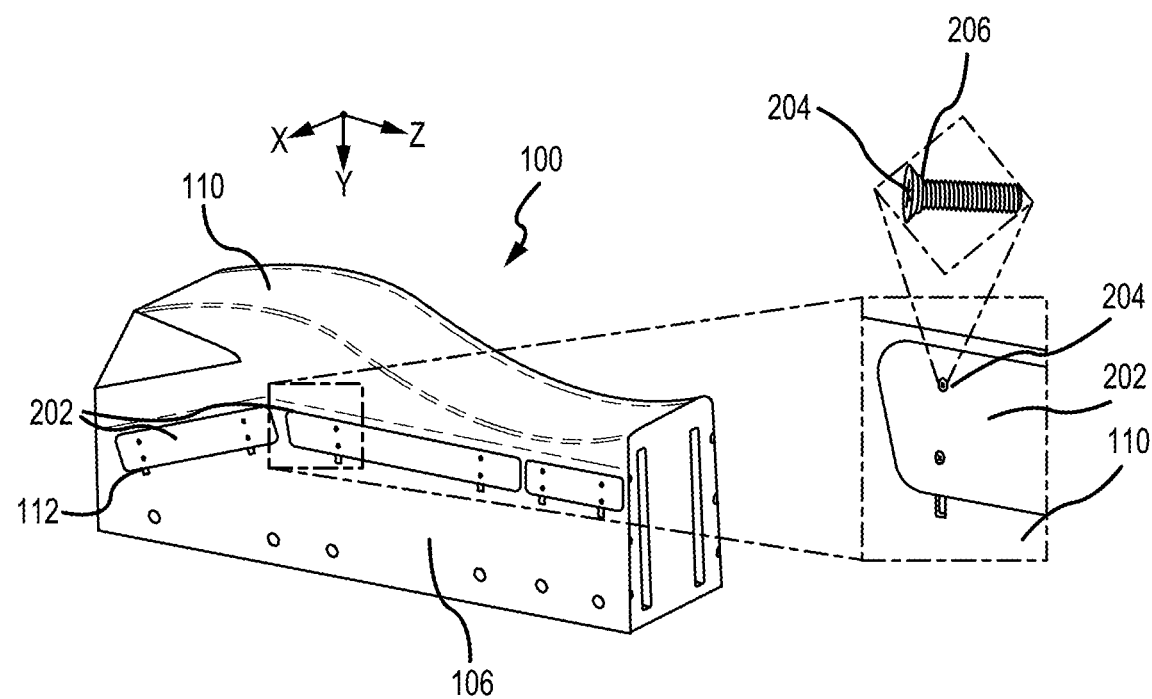
FIG. 2 illustrates a coupling of a plurality of floating plates to the IML, in accordance with various embodiments.

Turning to FIG. 2, in accordance with various embodiments, a coupling of a plurality of floating plates to the IML is illustrated. In various embodiments, a plurality of floating plates 202 outside the IML 100 of FIG. 1 may be coupled to a plurality of tensioning mechanisms inside the IML 100. In various embodiments, each floating plate in the plurality of floating plates 202 may traverse two of the plurality of pockets 112. In various embodiments, each floating plate in the plurality of floating plates 202 may be coupled to a respective tensioning mechanism via openings in each floating plate such that each floating plate is coupled using a set of screws 204, i.e., four screws, two screws per tensioning mechanism. While in the illustrated example, the floating plate is coupled using four screws, two for each tensioning mechanism, the various embodiments are not limited to the illustrated example. That is, in various embodiments, more or less screws may be utilized. For example, in various embodiments each floating plate in the plurality of floating plates 202 may be coupled to a respective tensioning mechanism via openings in each floating plate such that each floating plate is coupled using a set of screws, i.e., two screws, one screw per tensioning mechanism. As another example, in various embodiments, each floating plate in the plurality of floating plates 202 may be coupled to a respective tensioning mechanism via openings in each floating plate such that each floating plate is coupled using a set of screws, i.e., six screws, three screws per tensioning mechanism. In various embodiments, the set of screws may be flat head screws with a tapered angle to the threads. In various embodiments, each screw 204 may have an O-ring slid over the threads and up to the head of the screw 204 along the tapered angle so that the O-ring engages with a respective opening in each floating plate providing an air-tight attachment.

Figure 3A:
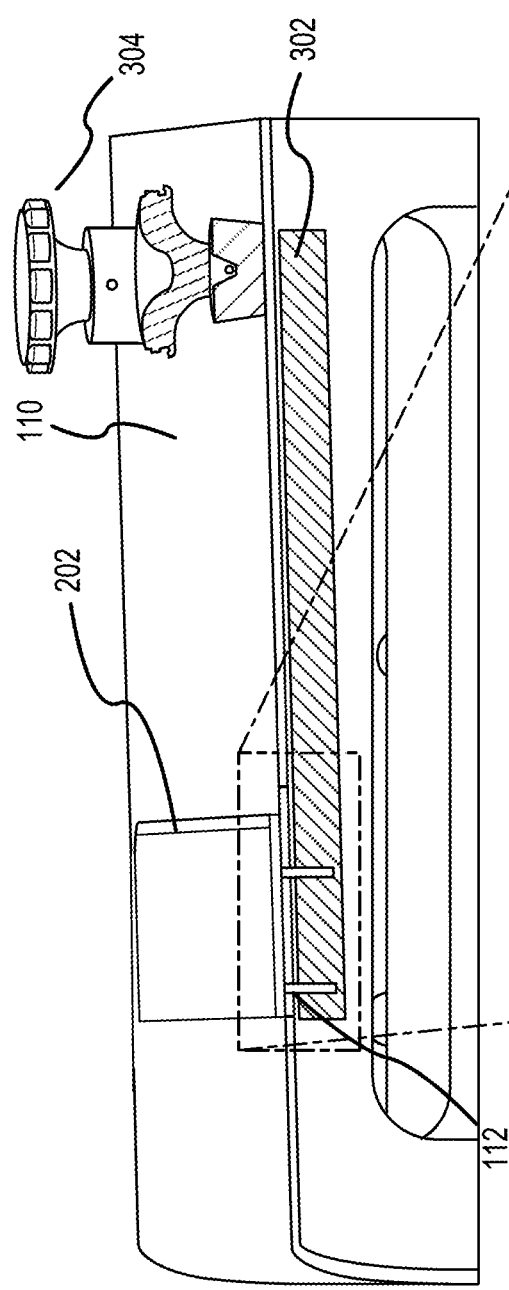
FIGS. 3A and 3B illustrates an isometric view of a gear rack-based tensioning system, in accordance with various embodiments.
Figure 3B:
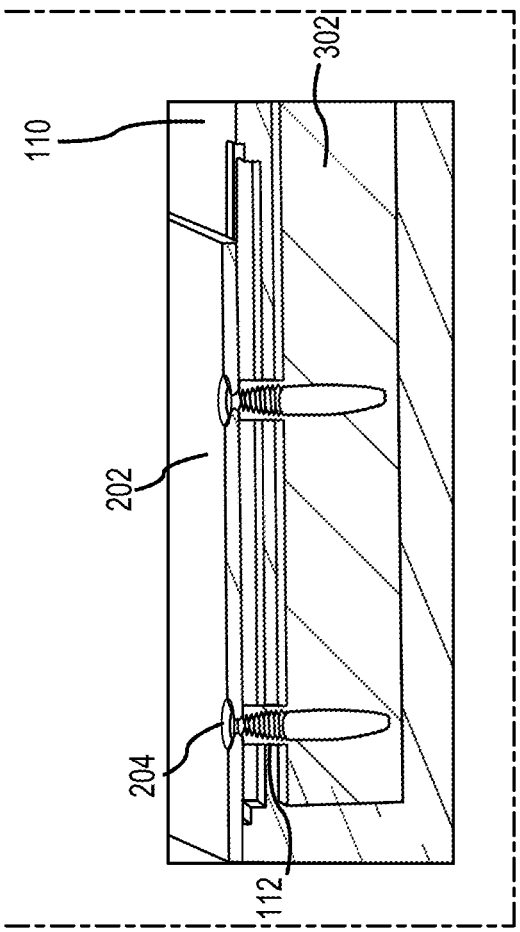

Turning to FIGS. 3A and 3B, in accordance with various embodiments, an isometric view of a gear rack-based tensioning system is illustrated. In the various embodiments, floating plate 202 is coupled to a first end of gear rack 302. In various embodiments, screws 204 are fed through the floating plate 202 and through a pocket of the pockets 112 such that the threads on an outer portion of the screws 204 engage with threads on an inner portion of openings on the first end of the gear rack 302. In various embodiments, the floating plate 202 is secured to the gear rack 302 such that the floating plate 202 is free to move in a translation direction along the IML surface 110 of the side sections 106 of the IML 100. In that regard, the pockets 112 allow enough clearance for the floating plates 202 to slide in a first direction or slide in a second direction to tension and un-tension the preform. In various embodiments, a second end of the gear rack 302 is coupled to a tensioning mechanism 304, which is hereafter described in detail.

Figure 4A:
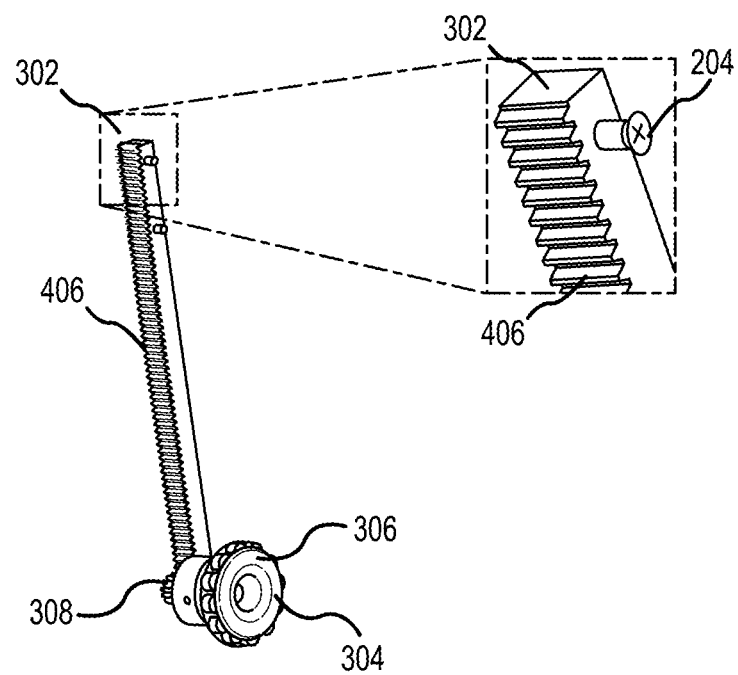
FIGS. 4A and 4B illustrates views of a gear rack, in accordance with various embodiments.
Figure 4B:
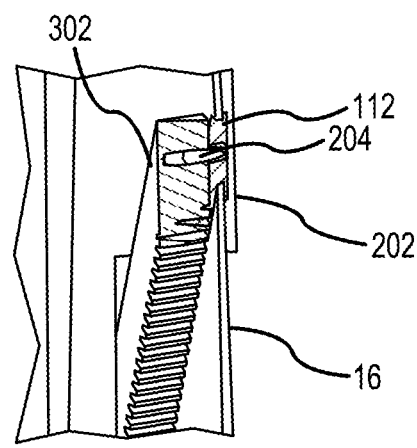

Turning to FIGS. 4A and 4B, in accordance with various embodiments, views of a gear rack, such as gear rack 302 of FIGS. 3A and 3B, is illustrated. In the various embodiments, of FIG. 4A, screw 204 has been inserted into a first end of the gear rack 302 up to a predefined length, with a portion of the screw 204 left extending from the gear rack to provide for the space of the floating plate and for the screw 204 to translate in a direction defined by the pocket in the IML. In various embodiments, a second end of the gear rack 302 is coupled to a tensioning mechanism 304. Tensioning mechanism 304 may include a knob 306 which includes a gear 308. In the various embodiments, threads on gear 308 of the tensioning mechanism 304 mesh with the threads 406 on the gear rack 302. In various embodiments, the knob 306 may be turned (by hand or electronically controlled), whereby rotary motion of the gear 308 is translated into linear motion of the gear rack 302, to move the floating plate 202 in a first direction or in a second direction to tension or un-tension the preform.

In the various embodiments of FIG. 4B, a cross section along the length of a pocket of the pockets 112 in a side section of the side sections 106 is illustrated. In various embodiments, screws 204 are fed through the floating plate 202 and through a pocket of the pockets 112 such that the threads on an outer portion of the screws 204 engage with threads on an inner portion of openings on the first end of the gear rack 302. In various embodiments, the threads on an outer portion of the screws 204 engage with threads on an inner portion of openings on the first end of the gear rack 302. In various embodiments, the gear rack 302 includes threads 406 along one outer surface from the first end of the gear rack 302 to a second end of the gear rack 302. In various embodiments, the threads 406 mesh with threads on an outer surface of a gear of the tensioning mechanism 304.

Figure 5A:
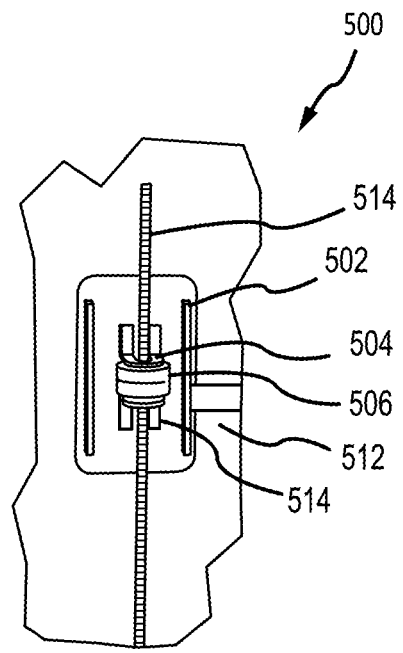
FIGS. 5A and 5B illustrates a screw-based tensioning system, in accordance with various embodiments.
Figure 5B:
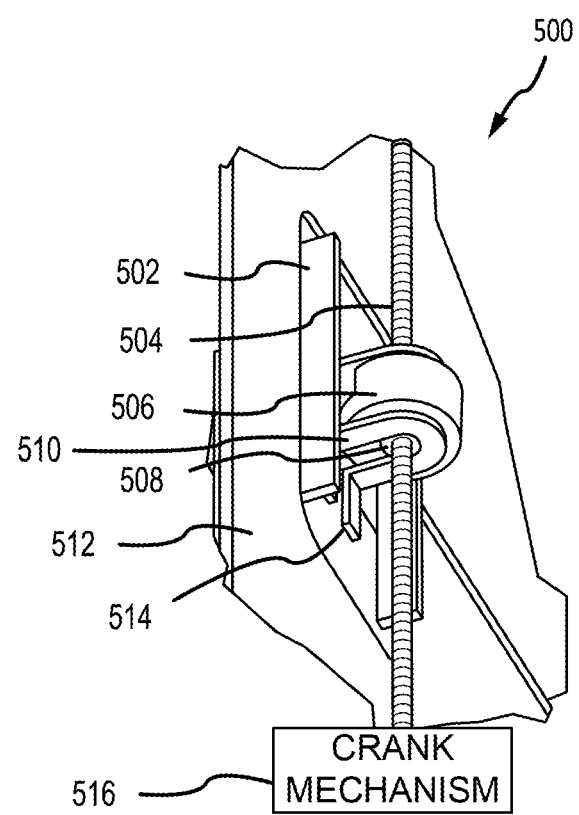

Turning to FIGS. 5A and 5B, in accordance with various embodiments, a screw-based tensioning system is illustrated. In various embodiments, the screw-based tensioning mechanism 500 includes grip plate guide rails 502, a lead screw 504, a collar assembly 506, a lead nut 508 in the collar assembly 506, and a bracket 510, which are positioned on an inside surface 512 of the IML, such as IML 100 of FIG. 1. In various embodiments, the grip plate guide rails 502 provide a guide in instances where the pocket 112 of FIG. 1 may be wider than the screw, such as screw 204 of FIG. 2. In that regard, the grip plate guide rails 502 align the floating plates, floating plate 202 of FIG. 2, with the respective pocket 112. In the various embodiments, the floating plate 202 may be coupled to an interface in the collar assembly 506. In that regard, the screw 204 may be fed through the floating plate 202 and through a pocket of the pockets 112 such that the threads on an outer portion of the screw 204 engage with threads on an inner portion of an opening within the collar assembly 506. In various embodiments, the threads on the outer surface of the lead screw 504 interfaces with threads on an inner surface of the lead nut 508 in the collar assembly 506. In various embodiments, interaction between the lead screw 504 and the lead nut 508 causes the lead nut to transition in a translation direction. In various embodiments, the collar assembly 506 is configured to be fixed within the bracket 510. In various embodiments, extensions 514 on the bracket 510 glide along the inside surface 512 of the IML. In that regard, bracket 510 reinforces the connection between the collar assembly 506 and the floating plate 202. In various embodiments, the bracket 510 may be fixed to the floating plate 202 to further reinforce the translating movement between the lead nut 508 and/or collar assembly 506 and the floating plate 202. In various embodiments, the lead screw 504 is fixed at both ends such that the lead screw 504 rotates when acted upon by a crank mechanism 516, such as hand crank, mechanical crank, or electrical crank, among others, that has a gearing mechanism with teeth that interfaces with the threads of the lead screw 504.

Figure 6:
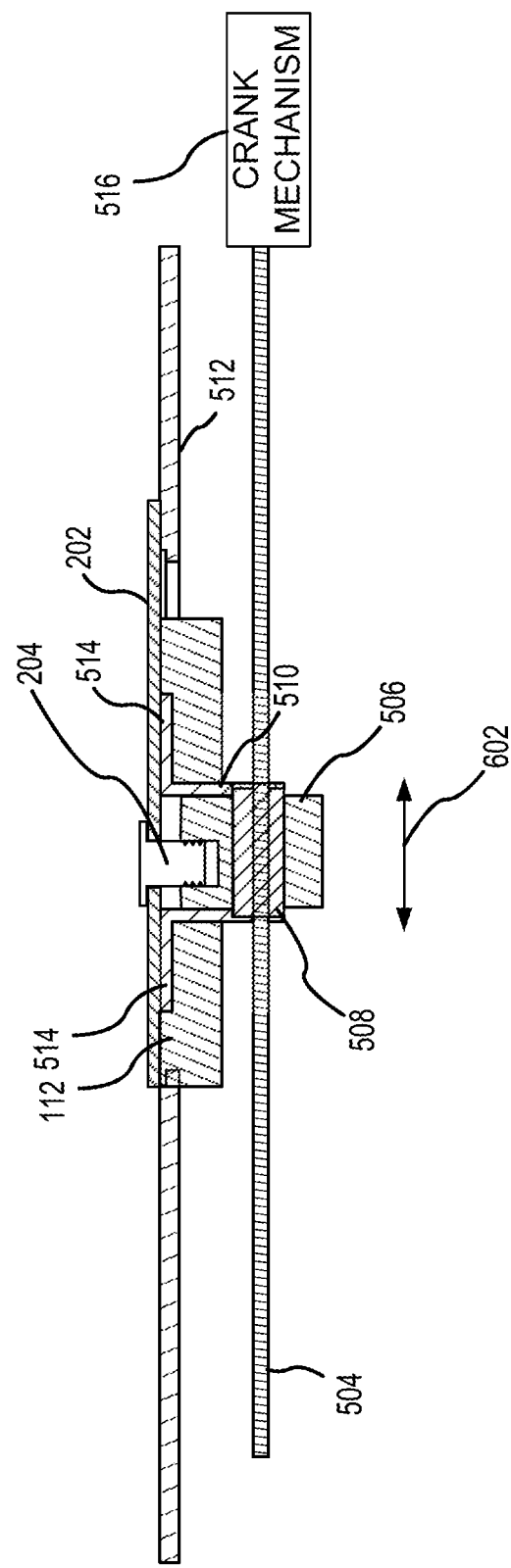
FIG. 6 illustrates a cross section of the screw-based tensioning system, in accordance with various embodiments.

Turning to FIG. 6, in accordance with various embodiments, a cross section of the screw-based tensioning system, such as screw-based tensioning mechanism 500 of FIGS. 5A and 5B, is illustrated. In various embodiments, the floating plate 202 of FIG. 2 is coupled to an interface in the collar assembly 506. In that regard, a screw, such as screw 204 of FIG. 2, is fed through the floating plate 202 and through a pocket of the pockets 112 such that the threads on an outer portion of the screw 204 engage with threads on an inner portion of an opening within the collar assembly 506. In various embodiments, the lead screw 504 interfaces with the lead nut 508 in the collar assembly 506. In various embodiments, interaction between the lead screw 504 and the lead nut 508 causes the lead nut to transition in a translation direction 602. In various embodiments, the collar assembly 506 is configured to be fixed within the bracket 510. In various embodiments, extensions 514 on the bracket 510 glide along the inside surface 512 of the IML. In that regard, bracket 510 reinforces the connection between the collar assembly 506 and the floating plate 202. In various embodiments, the bracket 510 may be fixed to the floating plate 202 to further reinforce the translating movement between the lead nut 508 and/or collar assembly 506 and the floating plate 202.

Figure 7B:
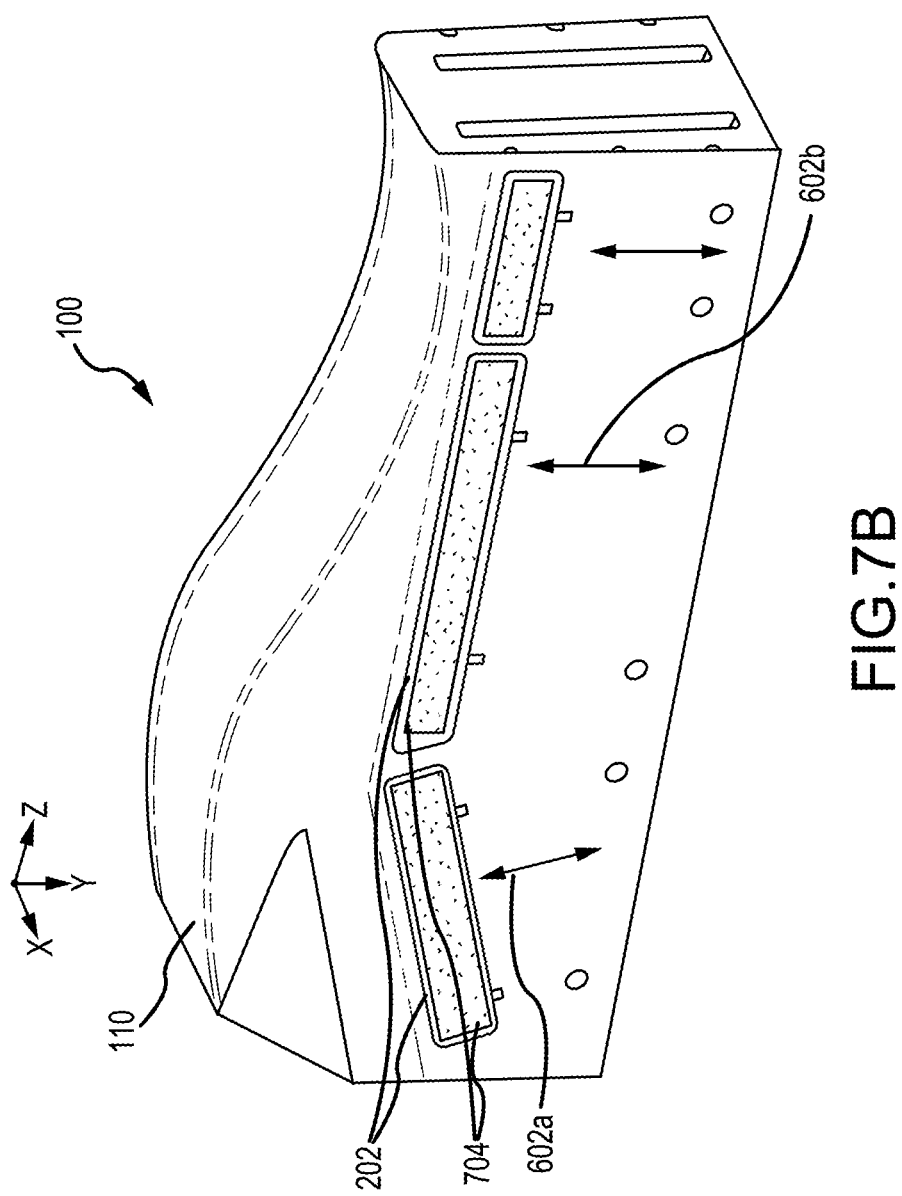

Turning to FIGS. 7A and 7B, in accordance with various embodiments, a grip strip application process is illustrated. In various embodiments, once the floating plates 202 are coupled to the IML surface 110 of the IML 100, an adhesion material 702 is applied to an outer surface of the floating plates 202, as illustrated in FIG. 7A. In various embodiments, the adhesion material 702 may be double-sided adhesive tape or glue, among others. In various embodiments, as illustrated in FIG. 7B, once the adhesion material 702 is applied, grip strips 704 are applied to the adhesion material 702. In various embodiments, the adhesion material 702 bonds the grip strips 704 to the floating plates 202. In various embodiments, rather than using the adhesion material 702, the grip strips 704 may be bonded to the floating plates 202 through mechanical methods, such as by using screws. In various embodiments, the grip strips 704 provide gripping mechanisms to grip the preform, such as pins angled downward, sharp teeth, or hooks, among others. In various embodiments, the gripping mechanism provide for pulling the preform as tension is applied via the described tensioning mechanisms. In various embodiments, a translation direction 602a is not the same as a second translation direction 602b. In various embodiments, translation direction 602a and translation direction 602b are linear.

Figure 8:
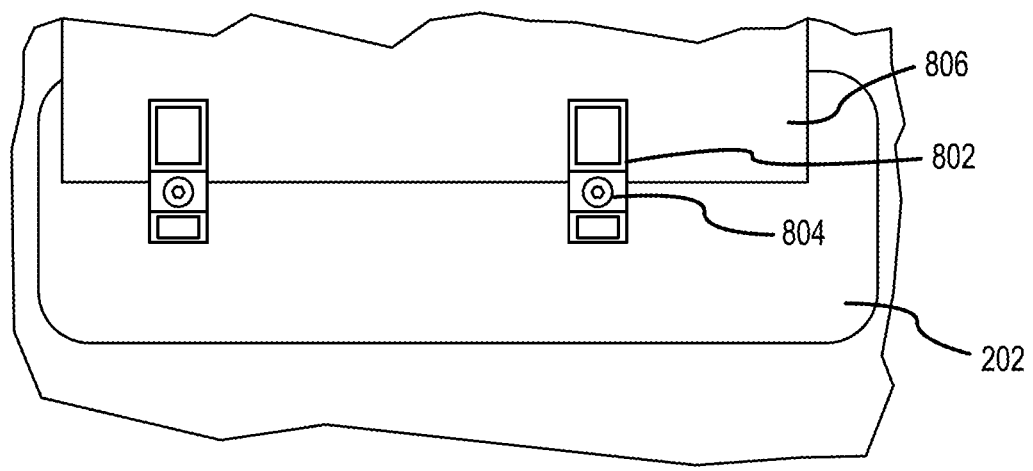
FIG. 8 illustrates a clamping mechanism, in accordance with various embodiments.

Turing now to FIG. 8, in accordance with various embodiments, a clamping mechanism is illustrated. In various embodiments, bladder-activated clamps 802 may be attached to the floating plate 202. In various embodiments, the bladder-activated clamps 802 may be coupled to the floating plate via screws 804. In various embodiments, the bladder-activated clamps 802 may be coupled to one of the above-described tensioning mechanisms, such as by replacing screws 204 of FIG. 2 with a longer screw fed through the floating plate 202 and through a pocket of the pockets 112 of FIG. 2 such that the threads on an outer portion of the screws 204 engage, for example, with threads on an inner portion of openings on the first end of the gear rack 302 of FIGS. 3A and 3B or with threads on an inner portion of an opening within the collar assembly 506 of FIGS. 5A and 5B. In various embodiments, bladder-activated clamps 802 clamps onto the preform board 806. In various embodiments, bladder-activated clamps 802 may be used in conjunction with grip strips 704 of FIGS. 7A and 7B. In that regard, the bladder-activated clamps 802 provide a clamping force to hold the preform board 806 to the grip strips 704 (or floating plate 202 if grip strips 704 are omitted).

Figure 9:
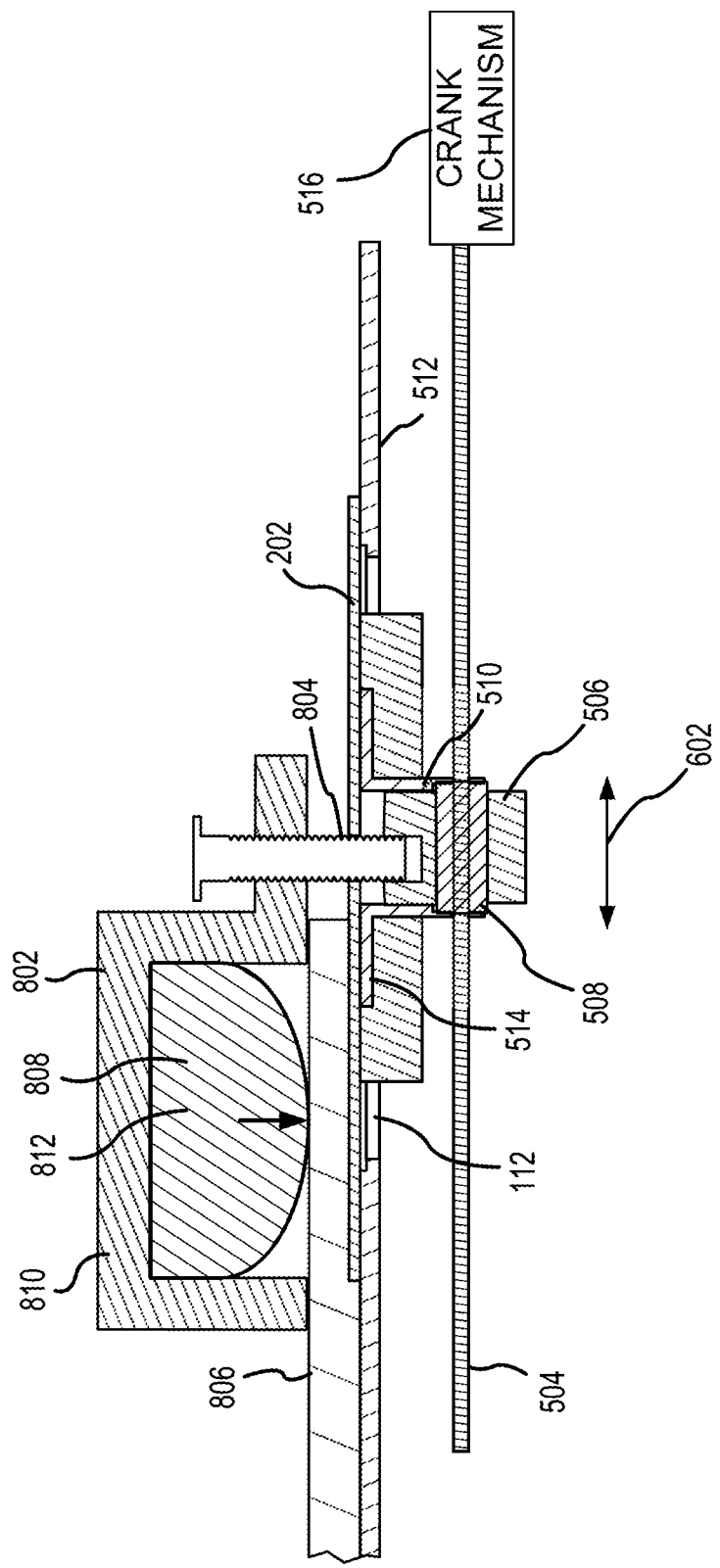
FIG. 9 illustrates a cross section of a bladder-activated clamp installed with a screw-based tensioning system, in accordance with various embodiments.

Turning to FIG. 9, in accordance with various embodiments, a cross section of the screw-based tensioning system, such as screw-based tensioning mechanism 500 of FIGS. 5A and 5B, utilizing bladder-activated clamps 802 is illustrated. In various embodiments, bladder-activated clamp 802 is coupled to the collar assembly 506 via the floating plate 202 of FIG. 2. In that regard, screw 804 is fed through an opening in the bladder-activated clamps 802, through an opening in the floating plate 202, and through a pocket of the pockets 112 such that the threads on an outer portion of the screw 804 engage with threads on an inner portion of an opening within the collar assembly 506. In various embodiments, the lead screw 504 interfaces with the lead nut 508 in the collar assembly 506. In various embodiments, interaction between the lead screw 504 and the lead nut 508 causes the lead nut 508 to transition in a translation direction 602. In various embodiments, the collar assembly 506 is configured to be fixed within the bracket 510. In various embodiments, extensions 514 on the bracket 510 glide along the inside surface 512 of the IML. In that regard, bracket 510 reinforces the connection between the collar assembly 506 and the floating plate 202. In various embodiments, the bracket 510 may be fixed to the floating plate 202 to further reinforce the translating movement between the lead nut 508 and/or collar assembly 506 and the floating plate 202.

In various embodiments, bladder-activated clamp 802 defines a recess or pocket 808 facing the preform board 806. For example, bladder-activated clamp 802 may comprise a bladder support body 810 defining the pocket. In various embodiments, in the installed position, an opening of the pocket 808 may be enclosed by the preform board 806. A bladder 812 (also referred to herein as clamping bladder) is disposed in pocket 808 of the bladder support body 810. Bladder 812 may be made from an elastomeric material such as rubber, among other materials. Bladder 812 may be mechanically, electrically, and/or pneumatically actuated (e.g., inflated) to provide a clamping force to hold the preform board 806, such as a peripheral portion of the preform board 806, to the floating plate 202. Stated differently, bladder 812 may be configured to expand to clamp preform board 806 between the bladder 812 and a clamping surface (e.g., the floating plate 202). Bladder 812 may be controlled using displacement, load, or visual sensors with feedback loops tied to the floating plate 202. Although illustrated together with a screw-based tensioning system in FIG. 9, it should be understood that bladder-activated clamp 802 may be used together with other types of tensioning systems, such as tensioning mechanism 304 of FIG. 3 for example.

Figure 10:
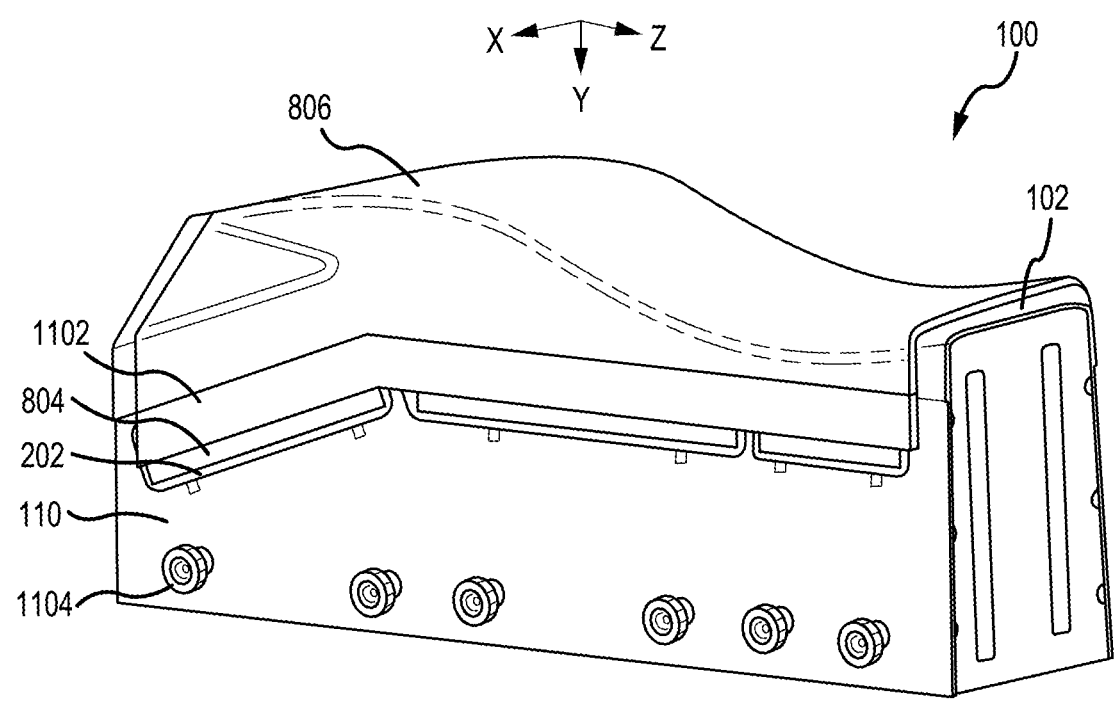
FIG. 10 illustrates tensioning of a preform over an inner-mold line utilizing tensioning systems, in accordance with various embodiments.

Turning to FIG. 10, in accordance with various embodiments, tensioning of a preform over an inner-mold line utilizing tensioning systems is illustrated. In various embodiments, the preform board 806 of FIG. 8 is laid over the top section 102 of the IML 100 of FIG. 1. The preform board 806 is then folded over the top section 102, pressing the preform grip area 1102 at the end of the preform board 806 in contact with the grip strips 704 on the floating plates 202 of FIG. 7B. Once the preform grip area 1102 is in contact with the grip strips 704, a tensioning system controls 1104, such as tensioning mechanism 304 of FIG. 3 or crank mechanism 516 of FIG. 6, is utilized to tension the preform board 806 over the IML surface 110 of FIG. 1. Moreover, a plurality of clamps, such as bladder-activated clamps 802 of FIG. 9, may provide a clamping force to hold the preform board 806 in contact with the grip strips 704.

Figure 11A:
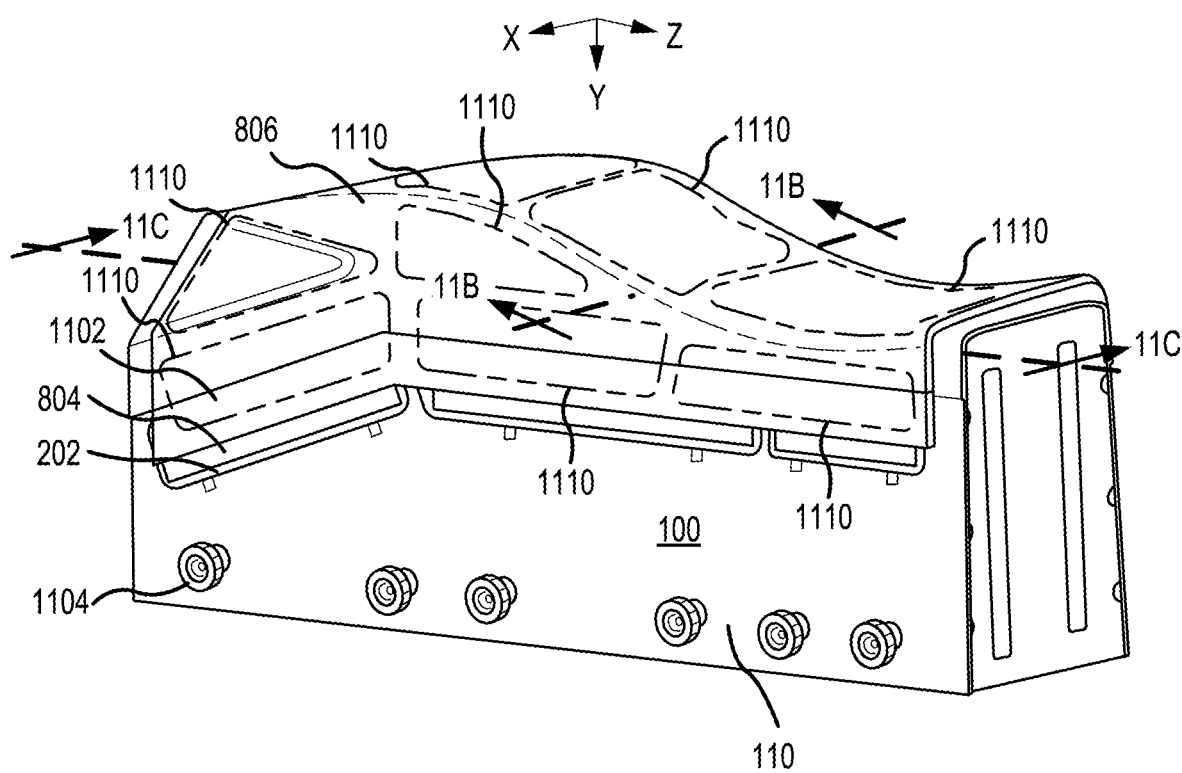
FIG. 11A illustrates a plurality of bladder areas with the bladders omitted for ease of illustration, in accordance with various embodiments.

Turning to FIG. 11A, in accordance with various embodiments, a plurality of bladder areas 1110 are highlighted with dashed lines. In various embodiments, the bladder areas 1110 may be disposed throughout the preform board 806 at various locations depending on the geometry and contours of IML surface 110 and/or the desired granularity of compression control. It should be understood that the bladder areas 1110 outlined in FIG. 11A are exemplary and the location of, and spacing between, bladder areas may be varied (e.g., there may be little to no spacing between bladders). In various embodiments, the bladder areas 1110 do not encompass the tensioning system controls 1104 of FIG. 10 so that the tensioning system controls 1104 may be easily accessed.

Figure 11B:
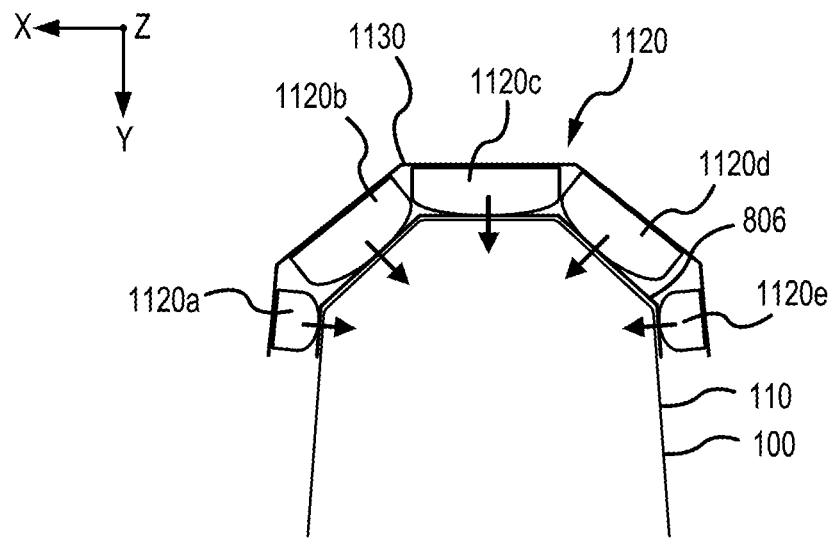
FIG. 11B illustrates a section view of a plurality of compressing bladders mounted to a caul plate for compressing a preform, in accordance with various embodiments.

Turning to FIG. 11B, in accordance with various embodiments, a transverse cross-section view of the plurality of bladders 1120 (e.g., bladder 1120a, bladder 1120b, bladder 1120c, bladder 1120d, and bladder 1120d) compressing the preform board 806 between the bladders 1120 and the IML surface 110 is illustrated. The bladders 1120 may be discretely dispersed along the preform board 806 in the transverse direction (e.g., along the X-direction). The bladders 1120 may be mounted to a caul plate 1130 (e.g., a metal plate, a composite plate, a plastic plate, or the like) which is moveable with respect to the IML tool 100. The caul plate 1130 has a different rigidity from that of the bladders 1120. The caul plate 1130 is more rigid than the bladders 1120, in accordance with various embodiments.

Figure 11C:
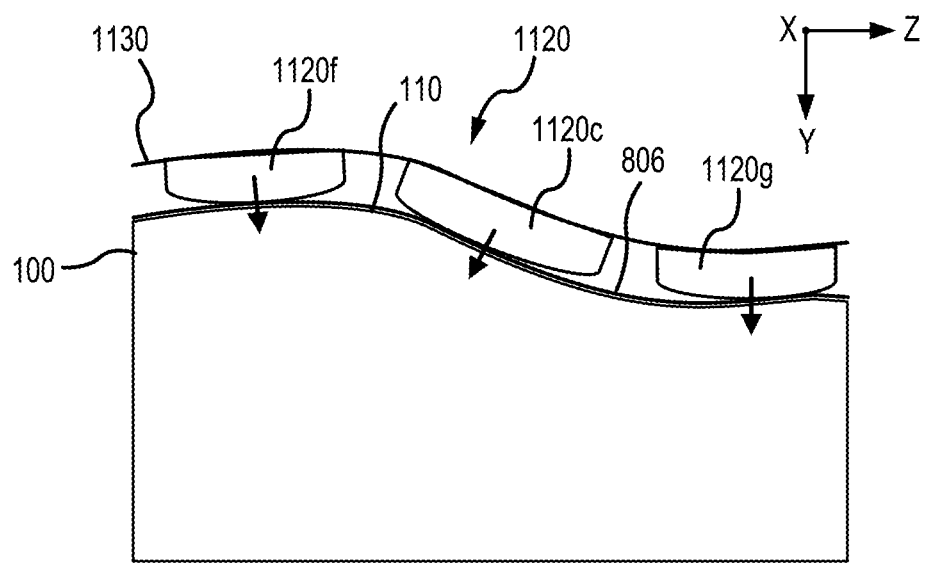
FIG. 11C illustrates a section view, taken perpendicular to the section view of FIG. 11B, of the plurality of compressing bladders mounted to the caul plate, in accordance with various embodiments.

Turning to FIG. 11C, in accordance with various embodiments, a longitudinal cross-section view, taken perpendicular to the transverse cross-section view of FIG. 11B, of the plurality of bladders 1120 (e.g., bladder 1120f, bladder 1120c, and bladder 1120g) compressing the preform board 806 between the bladders 1120 and the IML surface 110 is illustrated. The bladders 1120 may be discretely dispersed along the preform board 806 in the longitudinal direction (e.g., along the Z-direction). Each bladder 1120 may be strategically located to apply a compressive force to the preform board 806 to compress and shape the preform board 806 to conform to the shape of the IML surface 110. Moreover, the bladders 1120 may vary in size and shape, for example depending on the location of the bladder. For example, bladder 1120c may be large than bladder 1120a. Moreover, the shape of bladder 1120b may be different from that of bladder 1120a.

In various embodiments, plurality of bladders 1120 may be controlled (e.g., via a controller/processor) to compress/tension the preform simultaneously. Stated differently, activation (e.g., inflation) of the bladders 1120 may be controlled in concert with the tensioning system, such as screw-based tensioning mechanism 500 of FIGS. 5A and 5B, or gear rack 302 of FIGS. 3A and 3B. In various embodiments, the bladders 1120 may be tied to the translation of the floating grip plates 202/bladder-activated clamps 802. For example, a feedback loop that interfaces with the movement of the floating grip plates 202 may actuate the bladders 1120.

Figure 12:
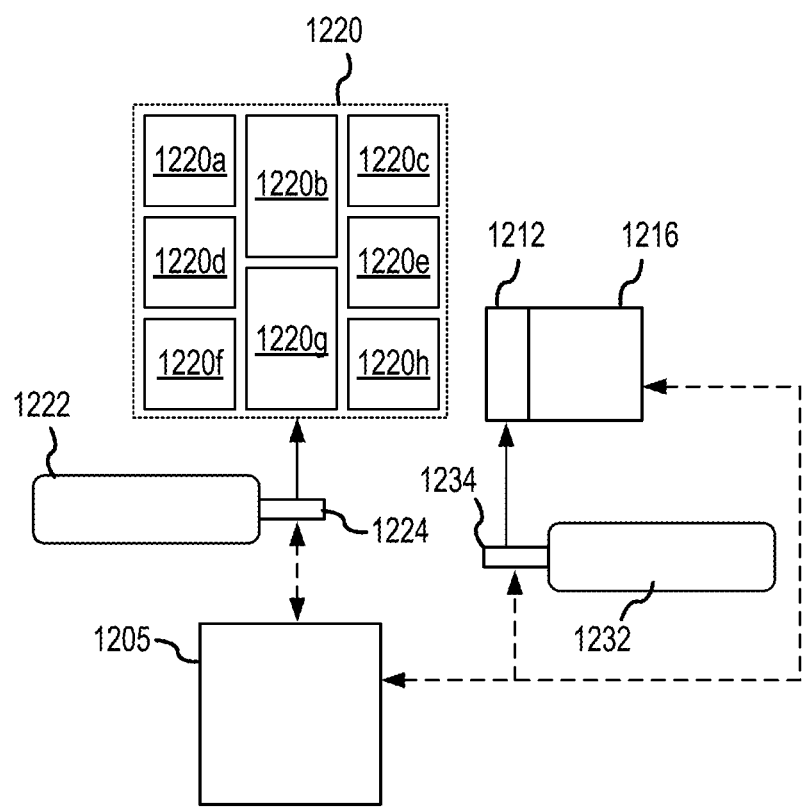
FIG. 12 illustrates a schematic view of a control system for the shape forming system, in accordance with various embodiments.

Turning to FIG. 12, in accordance with various embodiments, a schematic view of a plurality of bladders 1220 (e.g., bladders 1220a, 1220b, 1220c, 1220d, 1220e, 1220f, 1220g, 1220h; also referred to herein collectively or individually as a compressing bladder) for a system for forming a preform into a shaped body is illustrated. In various embodiments, bladders 1220 may be similar to bladders 1120 of FIG. 11B and FIG. 11C. Bladders 1220 may receive fluid from a fluid source 1222. The fluid source 1222 may comprise a valve 1224 for regulating the flow of fluid to the bladders 1220. A control unit 1205 may be in electronic communication with valve 1224 for controlling the state of valve 1224. In various embodiments, valve 1224 comprises a plurality of valves for individually controlling each bladder 1220. Activating bladders one at a time tends to allow preform tension/compression to be more precisely applied dependent on desired geometry of the preform.

Control unit 1205 may further be in electronic communication with a tensioning system 1216. Tensioning system 1216 may be similar to screw-based tensioning mechanism 500 of FIGS. 5A and 5B, or gear rack 302 of FIGS. 3A and 3B. In this manner, control unit 1205 may control tension on a preform board, such as preform board 806 (see FIG. 11).

Control unit 1205 may further be in electronic communication with a valve 1234 for a fluid source 1232. Although illustrated as having two fluid sources 1222 and 1232, it should be understood that a common fluid source may be utilized for the forming system of the present disclosure. A bladder 1212 may receive fluid from fluid source 1232. The fluid may be a compressible fluid (e.g., a gas such as air) or an incompressible fluid (e.g., water or a hydraulic fluid). Bladder 1212 may be similar to bladder 812 of FIG. 9. In this regard, bladder 1212 may be configured to apply a clamping force to a preform board for the tensioning system 1216. In this manner, control unit 1205 may control a clamping force on a preform board, such as preform board 806 (see FIG. 11).

In various embodiments, control unit 1205 may be configured to control activation of bladders 1220 (via valve 1224) in concert with tensioning system 1216 and/or bladder 1212 (via valve 1234). In various embodiments, control unit 1205 may operate bladders 1220 and tensioning system 1216 simultaneously or in sequence to allow the preform to be stretched as it is being compressed. In various embodiments, bladder 1220 and tensioning system 1216 pairs may be programmed to operate in sequence to prevent wrinkling, for example working from one end to another end of the preform, or from a section with low linear length to a section of high linear length across a width of the preform, or from a center of the preform outward, among other sequences. For example, a first compressing bladder 1220 and a first clamping bladder 1212 may be activated at a first time to apply a first compressive force and a first tension force, respectively, to the preform, and a second compressing bladder 1220 and a second clamping bladder 1212 may be activated at a second time to apply a second compressive force and a second tension force, respectively, to the preform. In various embodiments, bladders 1220 may be activated based upon feedback from tensioning system 1216 (e.g., as a function of the position of the tensioning system 1216 or a measured force being applied onto the preform by the tensioning system 1216). For example, a first compressive force applied by one or more bladders 1220 may be increased (e.g., by increasing an inflation pressure of the bladder 1220) while simultaneously increasing a first tension force applied by the tensioning system (e.g., by translating a floating plate, such as floating plate 202 of FIG. 7B. The first compressive force applied by one or more bladders 1220 may be increased (e.g., by increasing an inflation pressure of the bladder 1220) coupled with increasing the first tension force applied by the tensioning system (e.g., by translating a floating plate, such as floating plate 202 of FIG. 7B.

Figure 13:
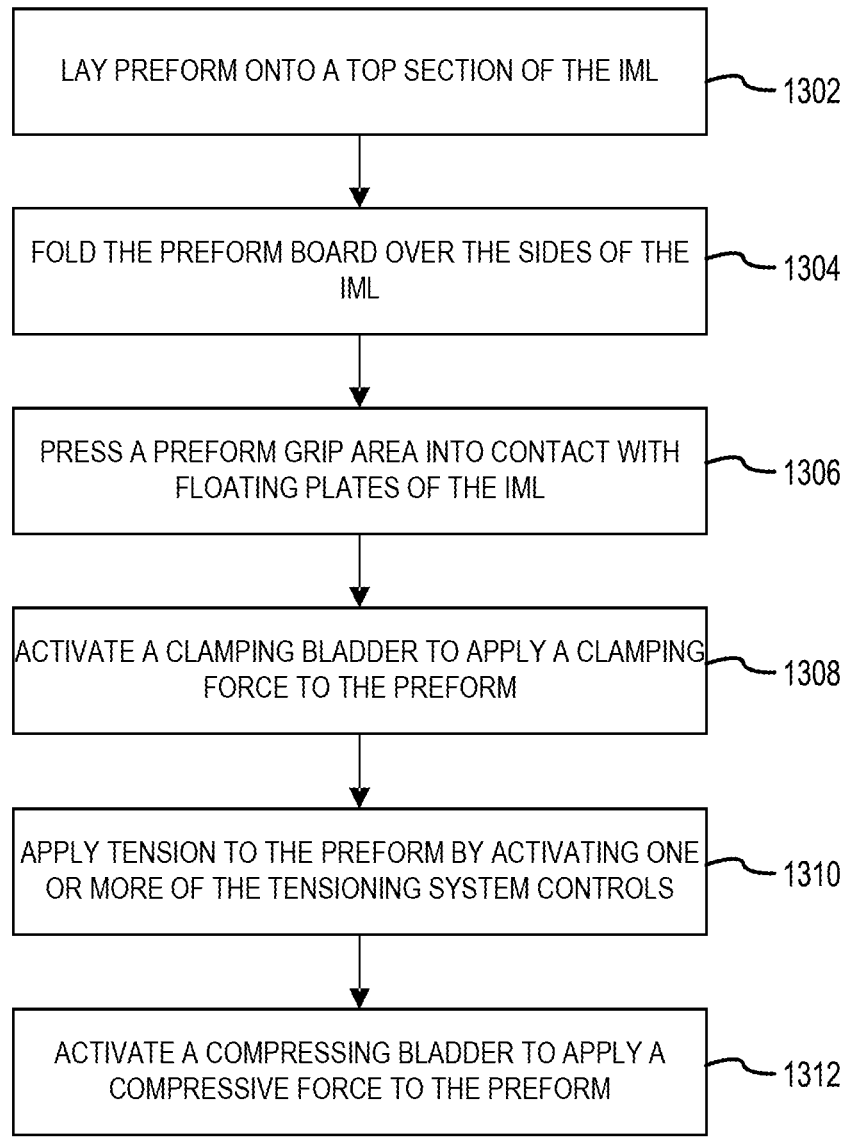
FIG. 13 illustrates a manufacturing method for forming a preform into a shaped body, in accordance with various embodiments.

Referring now to FIG. 13, in accordance with various embodiments, a manufacturing method for forming a preform into a shaped body is illustrated. For ease of description, the method 1300 is described with reference to FIGS. 1 thru 12. In step 1302, a preform board, such as preform board 806 of FIG. 8, is laid onto a top section of the IML, such as IML 100 of FIG. 1. At block 1304, the preform board is folded over the sides of the IML. At block 1306, a preform grip area, such as preform grip area 1102 of FIG. 10, is pressed into contact with floating plates of the IML, such as floating plates 202 of FIG. 7B. At block 1308, a bladder, such as bladder 812 of FIG. 9, is activated to apply a clamping force to the preform. At block 1310, tension is applied to the preform by activating one or more of the tensioning system controls, such as the tensioning system controls 1104 of FIG. 10, to translate the floating plates. At block 1312, a bladder, such as one or more of bladders 1120 of FIG. 11B and FIG. 11C, is activated to apply a compressive force to the preform thereby reducing or eliminating undesired wrinkling and kinking in the preform during part forming and forming the shaped body.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about," or "approximately" as used herein represent an amount close to the stated amount that still performs a desired function or achieves a desired result. For example, the term "substantially," "about," or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A manufacturing method, comprising:
   arranging a preform over a surface of an inner mold line;
   folding the preform over sides of the inner mold line;
   positioning an end of the preform over a floating plate coupled to a side of the inner mold line;
   clamping the end of the preform to the floating plate, wherein the clamping is provided by activating a clamping bladder to apply a first clamping force to the preform to secure the end of the preform with respect to the floating plate;
   translating the floating plate in a first direction to apply a first tension on the preform into a shaped body; and
   activating a first compressing bladder to apply a first compressive force to the preform.

2. The manufacturing method of claim 1, wherein the floating plate is coupled to a tensioning system through the side of the inner mold line.

3. The manufacturing method of claim 2, wherein the tensioning system is at least one of a gear rack-based tensioning system or a screw-based tensioning system.

4. The manufacturing method of claim 3, wherein the floating plate is coupled to the tensioning system through one or more pockets in the side of the inner mold line.

5. The manufacturing method of claim 1, wherein the first compressing bladder is activated by inflating the first compressing bladder with a fluid.

6. The manufacturing method of claim 1, wherein the first compressing bladder is mounted to a caul plate moveable with respect to the inner mold line, and wherein the caul plate has a different rigidity than the first compressing bladder.

7. The manufacturing method of claim 1, further comprising activating a second compressing bladder to apply a second compressive force to the preform, wherein the second compressing bladder is activated after the first compressing bladder.

8. The manufacturing method of claim 1, further comprising:
   increasing the first compressive force coupled with increasing the first tension.

9. The manufacturing method of claim 1, further comprising:
   activating a second compressing bladder to apply a second compressive force to the preform; and activating a third compressing bladder to apply a third compressing force to the preform.

10. The manufacturing method of claim 9, wherein the first compressing bladder, the second compressing bladder, and the third compressing bladder are activated sequentially along a second direction.

11. The manufacturing method of claim 9, wherein the first compressing bladder, the second compressing bladder, and the third compressing bladder are activated starting from a center of the preform and working outward toward a periphery of the preform.

* * * * *